US006420291B1

(12) United States Patent
Ritter et al.

(10) Patent No.: US 6,420,291 B1
(45) Date of Patent: Jul. 16, 2002

(54) LEAD SILICATE GLASS AND A PROCESS FOR SETTING A REDUCED SURFACE RESISTANCE OF THE LEAD SILICATE GLASS

(75) Inventors: Simone Ritter; Peter Brix, both of Mainz; Raimund Barden, Oestrich-Winkel; Claus Nitsch, Gross-Rohrheim; Wilfried Koudelka, Idstein, all of (DE)

(73) Assignees: Schott Glas, Mainz; PerkinElmer Optoelectronics, Wiesbaden, both of (DE)

( * ) Notice: Subject to any disclaimer, the term of this patent is extended or adjusted under 35 U.S.C. 154(b) by 0 days.

(21) Appl. No.: 09/572,573

(22) Filed: May 17, 2000

(30) Foreign Application Priority Data

May 19, 1999 (DE) .......................................... 199 22 678

(51) Int. Cl.[7] .................................................. C03C 3/07
(52) U.S. Cl. .......................................... 501/74; 65/32.1
(58) Field of Search ............................. 501/74; 65/32.1

(56) References Cited

U.S. PATENT DOCUMENTS

| 3,663,247 A | * | 5/1972 | Trap ............................. 501/74 |
| 3,776,743 A | | 12/1973 | Trap |
| 4,983,551 A | * | 1/1991 | Feller et al. .................. 501/74 |
| 6,166,365 A | * | 12/2000 | Simontnetti et al. ........ 250/207 |

FOREIGN PATENT DOCUMENTS

| DE | 3317778 | * | 11/1983 |
| FR | 2152608 A | | 4/1973 |

* cited by examiner

*Primary Examiner*—Karl Group
(74) *Attorney, Agent, or Firm*—Millen, White, Zelano & Branigan, P.C.

(57) ABSTRACT

The invention relates to a lead silicate glass, to the use thereof for the production of secondary electron multipliers, and to a process for setting a reduced surface resistance of a lead silicate glass of this type. The lead silicate glass has the following composition (in % by weight): $SiO_2$ 15–35, PbO 35–55, $Bi_2O_3$>20–29, BaO 0–10, $Cs_2O$ 0–10, BaO+$Cs_2O$ 2–13, CaO 0–10, SrO 0–10, CaO+SrO+BaO 0–10, and up to 1% by weight of conventional fining agents. The surface resistance of the lead silicate glass after reduction in a hydrogen atmosphere is from 0.1 to 60 MΩ/sq.

25 Claims, No Drawings

LEAD SILICATE GLASS AND A PROCESS FOR SETTING A REDUCED SURFACE RESISTANCE OF THE LEAD SILICATE GLASS

The invention relates to a lead silicate glass and to the use thereof for the production of secondary electron multipliers. The invention furthermore relates to a process for setting a reduced surface resistance of such lead silicate glasses according to the invention.

Secondary electron multipliers (SEMs) are, besides the photocathode, the main component of photomultipliers. The principle of operation of this electronic component is based on the outer photo effect, in which mobile charge carriers are generated through interaction of material (photocathode) with radiation (IR, visible and UV light, X-rays or radioactive radiation). Conventional photomultipliers consist of an evacuated glass tube (bulb) containing the photocathode and an anode. A number of electrodes, known as dynodes, are arranged between the cathode and the anode. The photoelectrons generated by irradiation with photons (or other particles of suitable energy) are accelerated by means of a voltage gradient between the electrodes and hit the dynode surface with a kinetic energy of about 100 eV and release a number of secondary electrons. Each electron produces a cascade of secondary electrons in this way. The photocurrent can thus be amplified by up to $10^9$ times. The function of the discrete dynodes can be taken over by a continuous glass tube surface if the latter has a suitable surface resistance, for example through coating or reduction. A photomultiplier of this type is described in the U.S. Pat. No. 6,166,365.

Open SEVs (without a photocathode) are furthermore employed for detecting electrons and ions, for example in mass spectrometers and residual gas analysers.

With a low surface resistance, better current flow can be ensured, which in turn guarantees optimum subsequent delivery of the released secondary electrons and enables an increase in the dynamic range. However, if the surface resistance is too low and thus the electrical conductivity is too high, undesired warming of the material occurs or even destruction thereof, for example through thermal stresses.

Besides a high secondary electron yield and a high amplification factor, a low background noise of the photomultiplier is necessary in order, for example on use in a gamma-ray camera for medical purposes, to achieve good image resolution. The background noise is caused by naturally occurring radioactive isotopes, such as potassium $_{19}^{40}K$ and rubidium $_{37}^{87}Rb$, which are used, for example, as a constituent of glasses and contribute towards undesired formation of secondary electrons.

Lead silicate glasses and the use thereof for secondary electron generation have been known for some time.

Thus, GB 1,239,687 describes a lead- and bismuth-containing silicate glass of the composition (in % by weight) $SiO_2$ 30–70, PbO 6–30, $Bi_2O_3$ 2–45, $Al_2O_3$ 0.5–10, MgO 0.5–7, and the optional components $B_2O_3=5$, $Na_2O=6$, $K_2O=10$, CaO+SrO=8, $As_2O_3+Sb_2O_3=2$. Likewise described is a dynode containing a plurality of glass channels produced from the said glass. A striking feature of this glass composition, besides the relatively low PbO proportion, is the wide $Bi_2O_3$ range with a relatively high upper limit.

PbO and $Bi_2O_3$ affect the surface resistance of the glass after reduction in the same way. However, one component cannot be replaced by the other. The combination of PbO and $Bi_2O_3$ within the abovementioned ranges results only in a limited range of the achievable surface resistance. Through the content of $K_2O$, the glass is of only limited suitability for the production of very sensitive secondary electron multipliers. The glass examples given all contain $K_2O$ in the range from 0.6 to 7.5% by weight. Due to the background noise associated therewith, the sensitivity of the dynodes containing the glass is significantly reduced.

The publication DE 33 177 78 A1 describes a glass which is suitable for the production of micro-channel plates which are used as secondary electron multipliers. A composition range (in mol %) of $SiO_2$ 63–72, PbO 20–30, alkali metal oxides 3–7, alkaline earth metal oxides 1–3.5 and $Al_2O_3$, $Bi_2O_3$, $Al_2O_3$ less than 1 is given for the glass. In this glass too, its surface resistance can only be set in a limited range. Due to the content of alkali metal oxides, the glass is of only limited suitability for the production of very sensitive secondary electron multipliers.

A similar situation applies to the glass claimed in the specification GB 2,218,982 A of the composition (in % by weight) $SiO_2$ 30–35, PbO 50–57, $Cs_2O$ 2–10, MgO+CaO+SrO+BaO 0–5, $Al_2O_3+ZrO_2+TiO_2+Nb_2O_5$ 0.1–1, and a molar ratio between $SiO_2$ and PbO of 2.0–2.4. Particularly low surface resistance values cannot be achieved through the said composition. High $Cs_2O$ contents likewise increase the achievable surface resistance greatly, meaning that, in overall terms, the resultant current flow cannot ensure the electrode push in the SEM.

A further lead silicate glass which is suitable for the generation of secondary electrons is described by the specification SU 17 175 66 A1. Besides $SiO_2$ and PbO, the glass contains 1–15 mol % of BeO. The use of BeO is extremely questionable for toxicological reasons. Furthermore, the surface resistance of this glass can again only be set in a limited range.

Furthermore, the specification JP 88 166 735 discloses a lead silicate glass having the composition (in % by weight) $SiO_2$ 15–65, PbO 15–75, $Al_2O_3$ 0–10, $CS_2O$ 0.1–50, $Li_2O$ 0–5, $Na_2O$ 0–10, $K_2O$ 0–20, $Rb_2O$ 0–30, $Cs_2O+Li_2O+Na_2O+K_2O+Rb_2O$ 0.1–50, $B_2O_3$ 0–20, $Al_2O_3$ 0–10, MgO 0–10, CaO 0–10, SrO 0–20, BaO 0–25, ZnO 0–15, CdO 0–10, MgO+CaO+SrO+BaO+ZnO+CdO 0–25, $Bi_2O_3$ 0–20, $Sb_2O_3$ 0–25, $Tl_2O$ 0–30, $Bi_2O_3+Sb_2O_3+Tl_2O$ 0–30, $TiO_2$ 0–10, $WO_3$ 0–7, $As_2O_3$ 0–2, $T_2$ 0–10, where at least one or two of the oxides $Bi_2O_3$, $Sb_2O_3$, $Tl_2O$, $WO_3$ or $As_2O_3$ must be present.

The specification JP 91 295 828 describes a glass containing heavy-metal oxides and rare-earth oxides. The heavy-metal oxides are PbO, $Bi_2O_3$, CdO, $Ga_2O_3$, $TeO_2$, $Sb_2O_3$, $As_2O_3$ and $GeO_2$. In the case of the two last-mentioned glasses, it is virtually impossible to foresee what effect the multiplicity of components mentioned will have on the surface resistance. In any case, targeted setting of the surface resistance is difficult. In addition, the use of a large number of components, which are frequently expensive, increases the production costs.

The object of the invention is to find a lead silicate glass. A glass should be simple to process and nevertheless have good heat stability. It should be possible to set a low surface resistance of the glass, and the glass should be suitable for the production of secondary electron multipliers having a stable secondary electron yield, a high amplification factor and low background noise. In addition, the resultant glass surface should be as smooth as possible in order substantially to avoid unevenness of the surface, which results in field emission and impairs the sensitivity of the secondary electron multipliers.

This object is achieved by a lead silicate glass, characterized by a composition by % weight, 15–35% $SiO_2$, 35–55% PbO, >20–29 $Bi_2O_3$, 0–10 BaO, 1–10 $Cs_2O$, 2–13 BaO+$Cs_2O$, 0–10 CaO, 0–10 SrO, 0–10 CaO+SrO+BaO, and up to 1% by weight of fining agents, the use of said glass for production of secondary electron multipliers, and by a process for setting a reduced surface resistance of said glass, characterized in that the lead silicate glass is exposed to a reducing hydrogen atmosphere, during which a certain surface resistance is set under defined reduction conditions, depending on the composition of the lead silicate glass.

In contrast to conventional lead silicate glasses, the glass according to the invention is distinguished by a proportion of >20–29% by weight of $Bi_2O_3$. Owing to its good processing properties, its nevertheless high heat stability and its particular properties, the glass is highly suitable for the production of secondary electron multipliers. Thus, the surface resistance of the glass can be set in a targeted manner in a particularly low and thus favourable region by reduction in the hydrogen atmosphere. The SEM component produced from the glass according to the invention has, after reduction of this glass, a stable secondary electron yield and a high amplification factor.

The lead silicate glass according to the invention contains less than 2% by weight of $K_2O$, in particular less than 1% by weight of $K_2O$ and preferably less than 0.05% by weight of $K_2O$. The lead silicate glass is particularly preferably potassium-free, apart from unavoidable amounts as present, for example, in the glass raw materials or in the wall material of a melting unit.

Due to the fact that glass components containing radioactive isotopes, such as $K_2O$ and $Rb_2O$, have been omitted, the SEM component has extremely low background noise. The glass withstands demanded temperature loadings in an excellent manner.

The glass according to the invention contains 15–35% by weight of $SiO_2$ and 35–55% by weight of PbO as network-forming constituents. At lower contents than 15% by weight of $SiO_2$, the glass transition temperature Tg drops. The temperature range between Tg and the softening point likewise reduces. Such short glasses have poor processing properties. In addition, only low operating temperatures of the SEM are then permissible in order to prevent thermal deformation of the component. $SiO_2$ contents of greater than 35% by weight result in disadvantageously high processing temperatures, which impair, in particular, the subsequent processing of the glass for the production of SEMs. The glass transition temperature (Tg) of the glass is preferably greater than 430° C. in order to make the SEM resistant to thermal deformations. The softening temperature, at which the glass can deform due to its inherent weight, is more than 100° C. above the glass transition temperature. Optimum process control in the production of the SEMs is thus ensured. An excessively high $SiO_2$ content (>35% by weight) furthermore adversely affects the crystallization tendency, making the surface nature of the glass unsuitable for the desired application.

The PbO constituent of 35–55% by weight, together with $Bi_2O_3$, which is present in an amount of >20–29% by weight, determines the surface resistance after reduction of the glass surface, for example in a hydrogen atmosphere. The two components ($Bi_2O_3$ and PbO) are vital in the reduction process for formation of a semiconducting layer on the surface of the glass, which is distinguished by a low surface resistance. Less than 20% by weight of $Bi_2O_3$ causes an increase in the surface resistance after reduction so that this is outside the desired range. At a $Bi_2O_3$ content above 25% by weight, the surface resistance after reduction drops so much that, on use as SEM, very high currents and thus undesired warming can occur, impairing the functioning of the SEM or even destroying the component. The same applies to PbO. If the PbO proportion drops below 35%, an undesired increase in the surface resistance occurs. If the PbO proportion exceeds 55% by weight, by contrast, a considerable reduction in the surface resistance is caused.

The glass contains BaO and $Cs_2O$ as network modifiers. The same job is done by CaO and SrO, which can additionally be employed if desired. The total alkaline earth metal content of the glasses should not exceed 10% by weight in order to ensure an appropriate combination of the physical properties, such as low thermal expansion $\alpha_{20/300}$ and the desired surface resistance. The use of $Cs_2O$ is particularly advisable if it is desired to avoid an excessive lowering of the surface resistance after reduction. The glass should contain in total from 2 to 13% by weight of BaO and $Cs_2O$.

The glass may in addition contain conventional fining agents, such as, for example, $As_2O_3$ and $Sb_2O_3$, which are used in conventional proportions of up to 1% by weight.

After reduction in a hydrogen atmosphere, the surface resistance of this glass is in the range from 0.1 to 60 MΩ/sq.

A lead silicate glass according to the invention having the composition (in % by weight) $SiO_2$ 20–30, PbO 38–52, $Bi_2O_3$ 21–26, BaO 0–9, $Cs_2O$ 0.1–9, BaO+$Cs_2O$ 3–12, CaO 0–9, SrO 0–9, CaO+SrO+BaO 0–9, and with up to 1% by weight of conventional fining agents has, besides the above advantages, a surface resistance of reduction in a hydrogen atmosphere of from 0.2 to 40 MΩ/sq.

By changing the glass composition and in particular the PbO and $Bi_2O_3$ contents, the desired surface resistance can be set in a targeted manner.

Thus, a glass, to which up to 1% by weight of conventional fining agents can be added, having a composition (in % by weight) of $SiO_2$ 21–30, PbO 39–51, $Bi_2O_3$ 22–25, BaO 0–9, $Cs_2O$ 0.2–6, CaO 0–8, SrO 0–8, CaO+SrO+BaO 0–9, has a surface resistance in the range from 0.3 to 25 MΩ/sq. A glass having the composition $SiO_2$ 22–29, PbO 40–50, $Bi_2O_3$ 23–25, BaO 0–8, $Cs_2O$ 0.2–5, BaO+$Cs_2O$ 4–10, CaO 0–7, SrO 0–7, CaO+SrO+BaO 0–9, has, after reduction, a surface resistance of from 0.4 to 20 MΩ/sq, and a glass having the composition $SiO_2$ 22–29, PbO 40–50, $Bi_2O_3$ 23–24, BaO 0–8, $Cs_2O$ 0.2–5, BaO+$Cs_2O$ 5–10, CaO 0–6, SrO 0–6, CaO+SrO+BaO 0–8, has a surface resistance of from 0.5 to 6 MΩ/sq.

In order to set a reduced surface resistance of a glass according to the invention, the glass is exposed to a reducing hydrogen atmosphere, during which a certain surface resistance is set, depending on the composition of the glass.

Besides the glass composition, the setting of the surface resistance by reduction of the glass on its surface plays an important role. Thus, the surface resistance can be set within the limits determined by the composition of the glass essentially by variation of temperature and reduction time within certain limits. The surface resistance passes through a minimum with increasing temperature. After a certain reduction time, a saturation value is reached. The optimum reduction conditions for setting a desired surface resistance for a glass of a certain composition can be determined experimentally in a simple manner.

The glasses according to the invention are produced as follows:

The raw materials are weighed out, subsequently mixed thoroughly, melted at about 1200–1400° C. by conventional methods and homogenized well. The temperature during casting is 1250° C. A melt example for the production of a lead silicate glass (corresponding to Example 2.3) is shown in Table 1.

Table 2 contains 12 working examples of glasses according to the invention in which a low surface resistance can be set by reduction in a hydrogen atmosphere (Examples 2.1 to 2.11). Example 2.12 shows a glass in which a correspondingly higher surface resistance can be set.

TABLE 1

Melt example for 100 kg of calculated glass
(see also Table 2 Ex. 2.3)

| Component | % by wt. | Raw materials | Weight (kg) |
|---|---|---|---|
| $SiO_2$ | 22.0 | $SiO_2$ | 21.96 |
| PbO | 45.0 | $Pb_3O_4$ | 46.02 |
| $Bi_2O_3$ | 24.0 | $Bi_2O_3$ | 23.98 |
| BaO | 5.8 | $BaCO_3$ | 7.58 |
| BaO | 2.2 | $Ba(NO_3)_2$ | 3.74 |
| $Cs_2O$ | 1.0 | $CsNO_3$ | 1.12 |
| Sum | 100.0 | | 104.38 |

TABLE 2

Examples of glasses having adjustable surface resistance $R_{(OF)}$ after reduction (glass composition in % by weight)

| | Example | | | | | | | | | | | |
|---|---|---|---|---|---|---|---|---|---|---|---|---|
| | 2.1 | 2.2 | 2.3 | 2.4 | 2.5 | 2.6 | 2.7 | 2.8 | 2.9 | 2.10 | 2.11 | 2.12 |
| $SiO_2$ | 22 | 29 | 22 | 29 | 26.1 | 26.32 | 26.92 | 27.00 | 27.05 | 27.12 | 27.16 | 28 |
| PbO | 50 | 43 | 45 | 40 | 41.58 | 40.99 | 40.33 | 40.00 | 40.00 | 40.00 | 40.00 | 40 |
| $Bi_2O_3$ | 24 | 24 | 24 | 23 | 24.00 | 24.00 | 24.00 | 23.86 | 23.67 | 23.34 | 23.2 | 24 |
| BaC | 4 | — | 8 | 8 | 8.00 | 8.00 | 8.00 | 8.00 | 8.00 | 8.00 | 8.00 | — |
| $Cs_2O$ | — | 4 | 1 | — | 0.32 | 0.69 | 0.75 | 1.14 | 1.29 | 1.53 | 1.64 | 8 |
| s BaO; $Cs_2O$ | 4 | 4 | 9 | 8 | 8.32 | 8.69 | 8.75 | 9.14 | 9.29 | 9.53 | 9.64 | 8 |
| CaO | — | — | — | — | — | — | — | — | — | — | — | — |
| SrO | — | — | — | — | — | — | — | — | — | — | — | — |
| s RO = Ca, Sr, Ba) | 4 | — | 8 | 8 | 8 | 8 | 8 | 8 | 8 | 8 | 8 | 0 |
| $As_2O_3$ | — | — | — | — | 0.2 | 0.2 | 0.2 | 0.2 | 0.2 | 0.2 | 0.2 | — |
| $Sb_2O_3$ | — | — | — | — | — | — | — | — | — | — | — | — |
| $R_{(OF)}$ (MΩ/sq) | 0.3 | 0.6 | 0.7 | 2.4 | 1.6 | 1.7 | 1.9 | 2.6 | 2.3 | 3.1 | 4.8 | 15.9 |

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing, all temperatures are set forth uncorrected in degrees Celsius; and, unless otherwise indicated, all parts and percentages are by weight.

The entire disclosure of all applications, patents and publications, cited above, and of corresponding German application No. 199 22 678.4, filed May 18, 1999, is hereby incorporated by reference.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A lead silicate glass comprising by % weight

| | |
|---|---|
| $SiO_2$ | 15–35, |
| PbO | 35–55, |
| $Bi_2O_3$ | >20–29, |
| BaO | 0–10, |
| $Cs_2O$ | 0–10, |
| BaO + $Cs_2O$ | 2–13, |
| CaO | 0–10, |
| SrO | 0–10, |
| CaO + SrO + BaO | 0–10, | and up to 1% by weight of one or more fining agents.

2. A lead silicate glass according to claim 1 comprising by % weight

| | | |
|---|---|---|
| $SiO_2$ | 20 | 30, |
| PbO | 38 | 52, |
| $Bi_2O_3$ | 21 | 26, |
| BaO | 0 | 9, |
| $Cs_2O$ | 0.1 | 9, |
| BaO + $Cs_2O$ | 3 | 12, |
| CaO | 0 | 9, |
| SrO | 0 | 9,and |
| CaO + SrO + BaO | 0 | 9. |

3. A lead silicate glass according to claim 1 comprising by % weight

| | | |
|---|---|---|
| $SiO_2$ | 21 | 30, |
| PbO | 39 | 51, |
| $Bi_2O_3$ | 22 | 25, |
| BaO | 0 | 9, |
| $Cs_2O$ | 0.2 | 6, |
| BaO + $Cs_2O$ | 3 | 11, |
| CaO | 0 | 8, |
| sro | 0 | 8, and |
| CaO + SrO + BaO | 0 | 9. |

4. A lead silicate glass according to claim 1 comprising by % weight

| | | |
|---|---|---|
| SiO$_2$ | 22 | 29, |
| PbO | 40 | 50, |
| Bi$_2$O$_3$ | 23 | 25, |
| BaO | 0 | 8, |
| Cs$_2$O | 0.2 | 5, |
| BaO + Cs$_2$O | 4 | 10, |
| CaO | 0 | 7, |
| SrO | 0 | 7, and |
| CaO + SrO + BaO | 0 | 9. |

5. A lead silicate glass according to claim 1 comprising by % weight

| | | |
|---|---|---|
| SiO$_2$ | 22 | 29, |
| PbO | 40 | 50, |
| Bi$_2$O$_3$ | 23 | 24, |
| BaO | 0 | 8, |
| Cs$_2$O | 0.2 | 5, |
| BaO + Cs$_2$O | 5 | 10, |
| CaO | 0 | 6, |
| SrO | 0 | 6, and |
| CaO + SrO + BaO | 0 | 8. |

6. A lead silicate glass according to claim 1 comprising less than 2% by weight of K$_2$O.

7. A lead silicate glass according to claim 6 comprising less than 0.05% by weight of K$_2$O.

8. A lead silicate glass according to claim 1 having a surface resistance after reduction in a hydrogen atmosphere of 0.1 to 60 MΩ/sq.

9. A lead silicate glass according to claim 2 having a surface resistance after reduction in a hydrogen atmosphere of 0.2 to 40 MΩ/sq.

10. A lead silicate glass according to claim 3 having a surface resistance after reduction in a hydrogen atmosphere of 0.3 to 25 MΩ/sq.

11. A lead silicate glass according to claim 4 having a surface resistance after reduction in a hydrogen atmosphere of 0.4 to 20 MΩ/sq.

12. A lead silicate glass according to claim 5 having a surface resistance after reduction in a hydrogen atmosphere of 0.5 to 6 MΩ/sq.

13. A lead silicate glass according to claim 1 having a glass transition temperature of above 430° C. and a softening temperature of more than 100° C. above the glass transition temperature.

14. A secondary electron multiplier comprising a lead silicate glass according to claim 1.

15. A process for setting a reduced surface resistance of a lead silicate glass according to claim 1 comprising exposing the lead silicate glass to a reducing hydrogen atmosphere.

16. A lead silicate glass according to claim 1, wherein the refining agent comprises As$_2$O$_3$ or Sb$_2$O$_3$.

17. A secondary electron multiplier comprising a lead silicate glass according to claim 3.

18. A secondary electron multiplier comprising a lead silicate glass according to claim 5.

19. A process for setting a reduced surface resistance of a lead silicate glass according to claim 3 comprising exposing the lead silicate glass to a reducing hydrogen atmosphere.

20. A process for setting a reduced surface resistance of a lead silicate glass according to claim 5 comprising exposing the lead silicate glass to a reducing hydrogen atmosphere.

21. A lead silicate glass according to claim 1 having a surface resistance of 0.1 to 60 MΩ/sq.

22. A lead silicate glass according to claim 2 having a surface resistance of 0.2 to 40 MΩ/sq.

23. A lead silicate glass according to claim 3 having a surface resistance of 0.3 to 25 MΩ/sq.

24. A lead silicate glass according to claim 4 having a surface resistance of 0.4 to 20 MΩ/sq.

25. A lead silicate glass according to claim 5 having a surface resistance of 0.5 to 6 MΩ/sq.

\* \* \* \* \*

UNITED STATES PATENT AND TRADEMARK OFFICE
CERTIFICATE OF CORRECTION

PATENT NO. : 6,420,291 B1
APPLICATION NO. : 09/572573
DATED : July 16, 2002
INVENTOR(S) : Ritter et al.

It is certified that error appears in the above-identified patent and that said Letters Patent is hereby corrected as shown below:

Title page, item (30) reads "May 19, 1999", should read --May 18, 1999--.

Signed and Sealed this

Thirteenth Day of October, 2009

David J. Kappos
*Director of the United States Patent and Trademark Office*